(12) United States Patent
Burden et al.

(10) Patent No.: US 7,355,330 B2
(45) Date of Patent: Apr. 8, 2008

(54) FIELD EMISSION MATERIAL HAVING AN INTER-LAYER SPACING AND FURTHER COATED WITH INSULATING MATERIAL

(75) Inventors: Adrian Paul Burden, Singapore (SG); Stephen Michael Baigrie, Swindon (GB)

(73) Assignee: Printable Field Emitters Limited, Shilton (GB)

( * ) Notice: Subject to any disclaimer, the term of this patent is extended or adjusted under 35 U.S.C. 154(b) by 208 days.

(21) Appl. No.: 10/472,095

(22) PCT Filed: Mar. 11, 2002

(86) PCT No.: PCT/GB02/00962

§ 371 (c)(1),
(2), (4) Date: Sep. 15, 2003

(87) PCT Pub. No.: WO02/073646

PCT Pub. Date: Sep. 19, 2002

(65) Prior Publication Data

US 2004/0131858 A1    Jul. 8, 2004

(30) Foreign Application Priority Data

Mar. 13, 2001 (GB) .................................. 0106358.5

(51) Int. Cl.
*H01J 1/304* (2006.01)
*H01J 1/312* (2006.01)

(52) U.S. Cl. ...................... 313/311; 313/309; 313/310; 313/351

(58) Field of Classification Search ........ 313/309–311, 313/495–497
See application file for complete search history.

(56) References Cited

U.S. PATENT DOCUMENTS

| 4,265,952 | A |   | 5/1981  | Caines       |         |
|-----------|---|---|---------|--------------|---------|
| 4,971,726 | A | * | 11/1990 | Maeno et al. | 252/511 |
| 5,733,480 | A | * | 3/1998  | Lee et al.   | 252/511 |
| 6,097,139 | A | * | 8/2000  | Tuck et al.  | 313/310 |
| 2002/0017854 | A1 | * | 2/2002 | Allmen et al. | 313/495 |

FOREIGN PATENT DOCUMENTS

| JP | 09-259737  | * | 10/1997 |
|----|------------|---|---------|
| WO | WO9706549  | * | 2/1997  |

\* cited by examiner

*Primary Examiner*—Mariceli Santiago
(74) *Attorney, Agent, or Firm*—Barnes & Thornburg LLP

(57) ABSTRACT

Graphite comprises atoms arranged in discrete layers (100). The perpendicular distance between these layers is the 'd-spacing' (101). A field emission material is obtained by expanding the d-spacing (102). Such expansion may be achieved by an intercalant that has been introduced between layers of the material. Such an intercalant may reside, or may no longer reside, in the material. The material may be placed in position on a substrate by a printing process, prior to expansion. Such field emission material may be used in cold cathodes in field electron emission devices.

53 Claims, 6 Drawing Sheets

FIELD EMISSION MATERIAL HAVING AN INTER-LAYER SPACING AND FURTHER COATED WITH INSULATING MATERIAL

This invention relates to field electron emission materials, and devices using such materials.

In classical field electron emission, a high electric field of, for example, $\approx 3\times 10^9$ V m$^{-1}$ at the surface of a material reduces the thickness of the surface potential barrier to a point at which electrons can leave the material by quantum mechanical tunnelling. The necessary conditions can be realised using atomically sharp points to concentrate the macroscopic electric field. The field electron emission current can be further increased by using a surface with a low work function. The metrics of field electron emission are described by the well known Fowler-Nordheim equation.

There is considerable prior art relating to electron emitters and emitting arrays which utilise field electron emission from sharp points (tips). The main objective of workers in the art has been to place an electrode with an aperture (the gate) less than 1 µm away from each single emitting tip, so that the required high fields can by achieved using applied potentials of 100V or less—these emitters are termed gated arrays. The first practical realisation of this was described by C A Spindt, working at Stanford Research Institute in California (*J. Appl. Phys.* 39,7, pp 3504-3505, (1968)). Since then, improvements to such emitter arrays have been suggested, including doping the bulk and surface of the tips with electropositive elements (U.S. Pat. No. 5,772,488).

Major problems with all tip-based emitting systems are their vulnerability to damage by ion bombardment, ohmic heating at high currents, the catastrophic damage produced by electrical breakdown in the device and the fact that making large area devices is both difficult and costly.

In about 1985, it was discovered that thin films of diamond could be grown to provide nominally flat field emitters—that is, field emitters that do not require deliberately engineered tips. Wang et al. reported (*Electron. Lett.*, 27, pp 1459-1461 (1991)) that field electron emission current could be obtained from broad area diamond films with electric fields as low as 3 MV m$^{-1}$. This performance is believed by some workers to be due to a combination of the low electron affinity of the (111) facets of diamond and the high density of localised, accidental graphite inclusions (Xu, Latham and Tzeng: *Electron. Lett.*, 29,pp 1596-159 (1993)) although other explanations have been proposed. Since this discovery, other researchers have reported successful field electron emitters and corresponding display devices being formed predominately of graphite, such as Tcherepanov et al. (*J. Vac. Sci. Technol. B* 13, 2, pp. 482-486 (1995)). In addition, other thin-films have been reported to field electron emit at low threshold fields, including amorphous carbon and amorphous silicon materials (Silva et al., *J. Vac. Sci. Technol. B*, 17, 2, pp. 596-600 (1999)).

Related to this, but arising from work that studied the mechanisms associated with electrical breakdown between electrodes in vacuum (e.g. Latham and Xu, *Vacuum,* 42, 18, pp 1773-1181 (1991), electrons are known to leave relatively flat surfaces at active sites that are metal-insulator-vacuum (MIV) structures. These are formed by either embedded dielectric particles or conducting flakes sitting on insulating patches such as the surface oxide of the metal. In both cases, the current comes from a hot electron process that accelerates the electrons resulting in quasi-thermionic emission over the surface potential barrier. This is well described in the scientific literature e.g. Latham, *High Voltage Vacuum Insulation,* Academic Press (1995). Only recently have these teachings been modified and applied to create field electron emitters that can operate as useable vacuum-sealed devices (Tuck, Taylor and Latham (GB 2304989)).

Their teachings suggest that such emission is a general property of inorganic insulator layers containing conducting or semi-conducting particles. To a degree this is true, but later teachings (Tuck et al. WO 0103154) indicated that there are combinations of particle and insulator materials for which the electric field required to obtain emission, the emission site density thus obtained and the overall uniformity are generally acceptable for use in electronic devices. Moreover, graphite particles within such composites were highlighted as exemplary.

Preferred embodiments of the present invention aim to provide further improved field electron emitters containing graphite.

Preferred embodiments of the present invention aim to provide improved field electron emitting materials and devices that may be used in devices that include (amongst others): field electron emission display panels; high power pulse devices such as electron MASERS and gyrotrons; crossed-field microwave tubes such as CFAs; linear beam tubes such as krystrons; flash x-ray tubes; triggered spark gaps and related devices; broad area x-ray sources for sterilisation; vacuum gauges; ion thrusters for space vehicles; particle accelerators; lamps; ozonisers; and plasma reactors.

According to one aspect of the present invention, there is provided a field electron emission material formed of a material comprising layers of atoms, in which the inter-layer spacing has been expanded Preferably, said layers are crystalline.

Said layers may be turbostratic.

Said layers may be highly ordered.

Preferably, said layered material comprises graphite.

Said layered material may comprise at least one of carbon nanotubes, carbon fibres, carbon Buckyonions and carbon black.

Said layered material may comprise at least one of $MoS_2$, perovskites, micas, and hexagonal boron nitride.

Preferably, said expanded layered material is particulate.

Preferably, the particle size of said expanded layered material is in the range 0.1 to 1000 µm, in the direction of expansion.

Preferably, the particle size of said expanded layered material is in the range 0.1 to 400 µm, in a direction normal to the direction of expansion.

Preferably, said expanded layered material is disposed upon a planar substrate, and its layers are oriented at an angle greater than 0 degrees to the substrate plane.

Said layers may be oriented substantially perpendicular to said substrate plane.

Preferably, said expanded layered material is an electrically conductive material that is at least partly coated with an electrically insulating material to form a MIV structure.

Preferably, said expanded layered material is an electrically conductive material that is at least partly coated with an electrically insulating material to form a MIMIV structure.

Preferably, said expanded layered material is particulate and has a DBP number in the range 20 to 500.

Preferably, said layered material has been expanded by an intercalant that has been introduced between layers of the material.

Said intercalant may no longer reside in the material.

At least some of said intercalant may remain in the material.

An intercalant may be introduced between layers of the material, after expansion of the material.

Preferably, said material has been placed in position on a substrate by a printing process.

Preferably, said layered material has been expanded during a curing cycle of the material.

Said curing may take place after the material has been placed in position on a substrate.

The invention extends to a method of making a field emission material, comprising the step of causing layers of a layered material to expand. Such a material may be in accordance with any of the preceding aspects of the invention.

The invention extends to a field electron emitter formed from a field emission material according to any of the preceding aspects of the invention, and arranged to serve as a cathode in a field electron emission device.

Such a field electron emitter may be arranged to emit electrons without the application of heat.

The invention extends to a field electron emission device comprising a field electron emitter according to either of the preceding aspects of the invention, and means for applying an electric field to said field emission material, thereby to cause said material to emit electrons.

In such a device curing of said field emission material preferably takes place during an assembly process of said device.

A field electron emission device as above may comprise a substrate with an array of patches of said field electron emitters, and control electrodes with aligned arrays of apertures, which electrodes are supported above the emitter patches by insulating layers.

Preferably, said apertures are in the form of slots.

A field electron emission device as above may comprise a plasma reactor, corona discharge device, silent discharge device, ozoniser, an electron source, electron gun, electron device, x-ray tube, vacuum gauge, gas filled device or ion thruster.

The field electron emitter may supply the total current for operation of the device.

The field electron emitter may supply a starting, triggering or priming current for the device.

A field electron emission device as above may comprise a display device.

A field electron emission device as above may comprise a lamp.

Said lamp may be substantially flat.

Said emitter may be connected to an electric driving means via a ballast resistor to limit current.

Said ballast resistor may be applied as a resistive pad under each said emitting patch.

Said emitter material and/or a phosphor may be coated upon one or more one-dimensional array of conductive tracks which are arranged to be addressed by electronic driving means so as to produce a scanning illuminated line.

A field electron emission device as above may include said electronic driving means.

Preferably, said field emitter is disposed in an environment which is gaseous, liquid, solid, or a vacuum.

A field electron emission device as above may comprise a cathode which is optically translucent and is so arranged in relation to an anode that electrons emitted from the cathode impinge upon the anode to cause electro-luminescence at the anode, which electro-luminescence is visible through the optically translucent cathode.

The term "exfoliation" is sometimes used in the art to refer to the expansion of layered materials and, for the purposes of this specification, the terms "expand" and "exfoliate" and their derivates are synonymous.

Reference is made in this specification to both MIV (Metal-Insulator-Vacuum) and MIMIV (Metal-Insulator-Metal-Insulator-Vacuum) structures. As will be understood by those skilled in the art, in this context, the term "Metal" may include any suitable conductive material and the term "Vacuum" may include any environment in which the material is disposed. In the context of this specification, the term "insulator" includes both organic and inorganic insulators.

It will be appreciated that the electrical terms "conducting" and "insulating" can be relative, depending upon the basis of their measurement. Semiconductors have useful conducting properties and, indeed, may be used in the present invention as conducting particles. In the context of this specification, conductive and insulating materials when used together are distinguished by the conductive material having an electrical conductivity at least $10^2$ times (and preferably at least $10^3$ or $10^4$ times) that of the insulating material.

For a better understanding of the invention, and to show how embodiments of the same may be carried into effect, reference will now be made, by way of example, to the accompanying diagrammatic drawings, in which.

The materials in FIG. 1 illustrate the principle of expansion, in the context of this specification. FIG. 1a shows a material comprising atoms arranged in discrete layers 100, as in the case of graphite. The perpendicular distance between these layers is called the 'd-spacing' 101. In the case of nominally flat and parallel sheets as shown, the d-spacing is the same regardless of the position at which it is measured on a given layer. FIG. 1b shows that when this spacing is larger 102, the material is expanded. This is the meaning of the term "expanded", its equivalents and derivatives, in the context of this specification. It is to be distinguished from surface intercalation, in which an element (or other constituent) may be introduced only at a surface region of a material, in order to make that element available at the surface of the material.

Figure 1A:
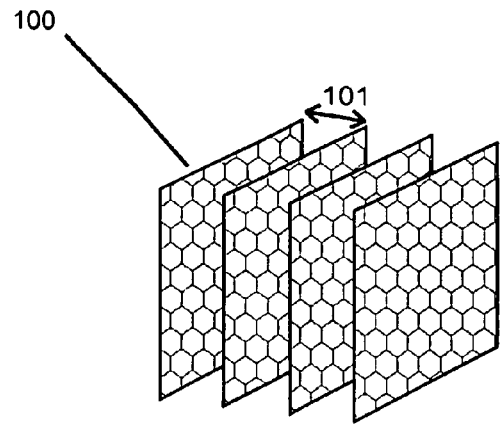
FIG. 1a shows four layers of atomic planes forming part of a layered crystal.
Figure 1B:
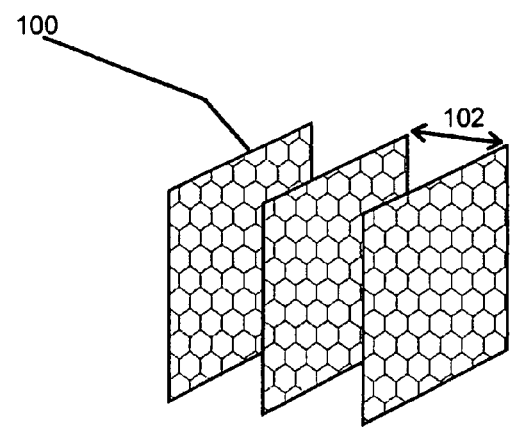
FIG. 1b shows part of the layered crystal in FIG. 1a that has been expanded.
Figure 1C:
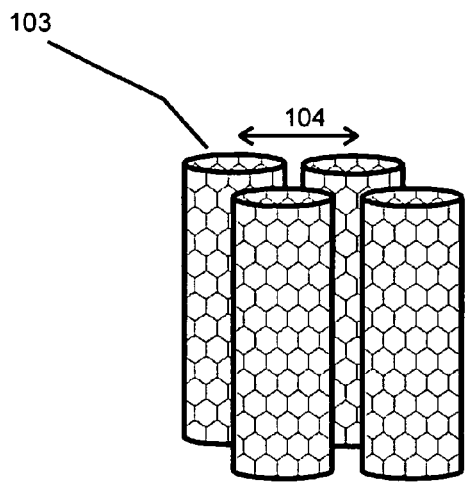
FIG. 1c shows four single-walled nanotubes forming part of a bundle.
Figure 1D:
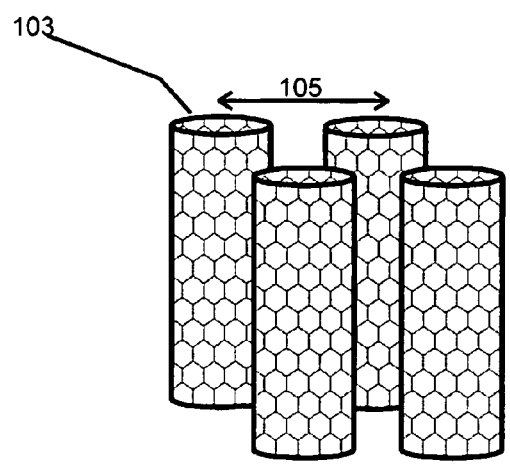
FIG. 1d shows a bundle of single-walled nanotubes in which the space between them is larger.

In FIG. 1c, a group of nanotubes 103 has a centre-to-centre spacing shown as 104. However, it will be clear that the perpendicular spacing between the cylindrical layers is continuously variable depending on where the measurement is made. In other words, the space between the nanotubes is not the 'd-spacing', but is in fact outside the domain of the crystal and is more properly described as a pore. The enlargement of this distance, as shown in FIG. 1d at 105, is therefore not what is meant by the term "expanded", its equivalents and derivatives, in the context of this specification.

Figure 1E:
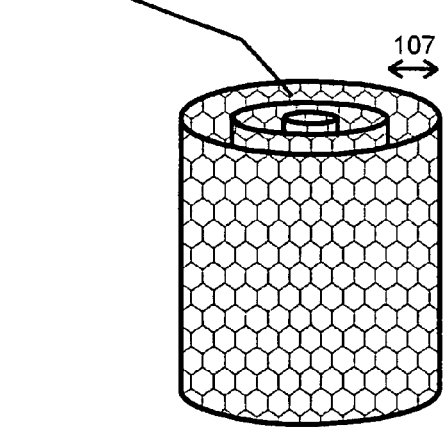
FIG. 1e shows a multi-walled nanotube.
Figure 1F:
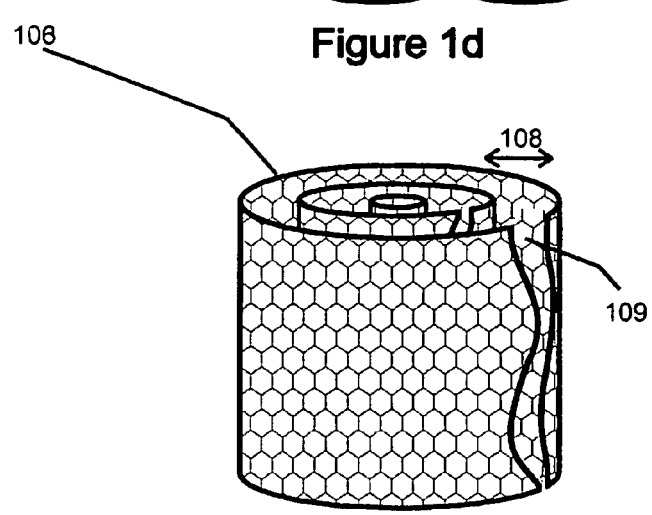
FIG. 1f shows an expanded multi-walled nanotube.

FIG. 1e shows a multi-walled nanotube 108, which is in effect the combination of FIGS. 1a and 1c. Hence, this material does have a self-consistent 'd-spacing' 107 that is the same regardless of where on the selected layer it is measured. It too can be expanded, as shown in FIG. 1f at 108, although in this case it is necessary for a tear 109 to occur in each of the closed cylinders to accommodate the necessary growth in the diameter. Such a structure falls within the meaning of the term "expanded", its equivalents and derivatives, in the context of this specification.

Figure 2:
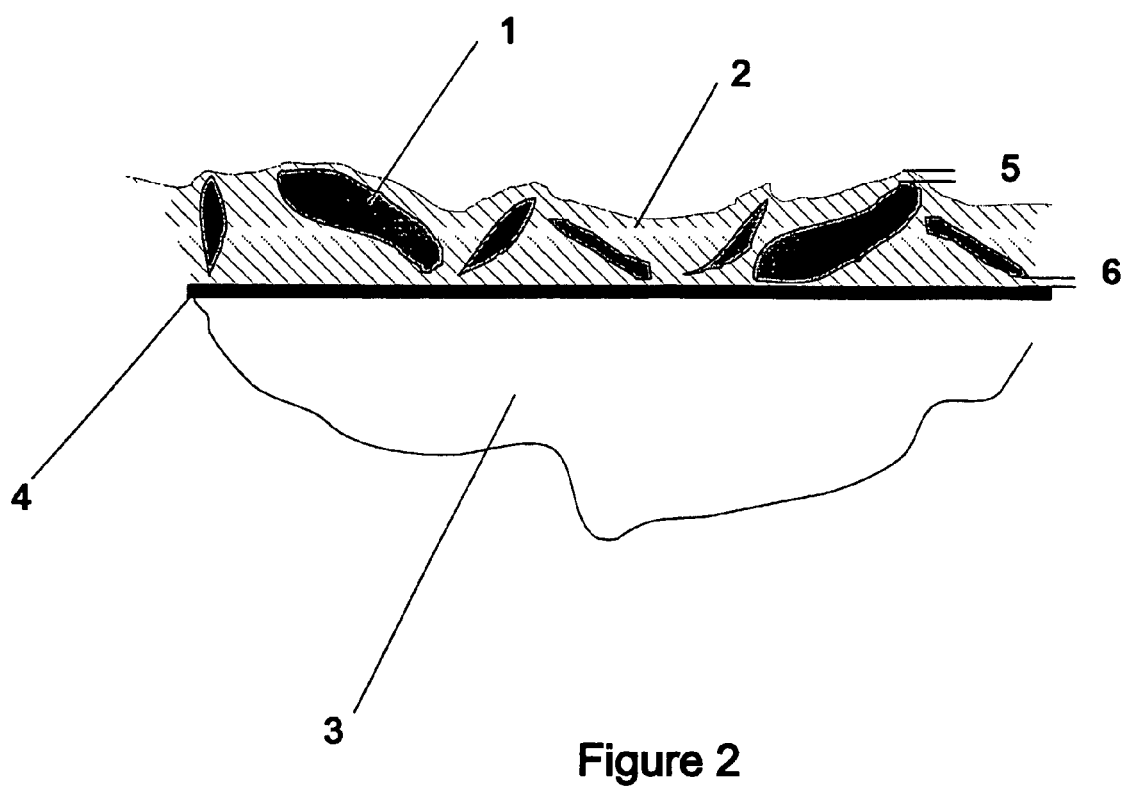
FIG. 2 shows one example of a metal-insulator-metal-insulator-vacuum (MIMIV) field emitting structure.

The field emitting material illustrated in FIG. 2 comprises electrically conducting or semi-conducting particles 1 in an inorganic electrically insulating matrix 2, in the form of a MIMIV structure (in which case thicknesses 5 and 6 are both greater than zero) or a MIV structure (in which case thickness 5 or 6 is zero). The material is disposed on a substrate 3 having an electrically conductive surface 4, often referred to as a "back-contact".

Some or all of the particles 1 are layered particles with expanded inter-planer spaces, as will be described in more detail below. More specifically, some or all of the particles may comprise expanded graphite (EG), which may comprise a graphite intercalation compound (GIC). GICs are also known as graphite insertion compounds, and in this context in this specification, the terms "intercalate" and "insert", and their derivatives, are synonymous.

Figures 3A, 3B:
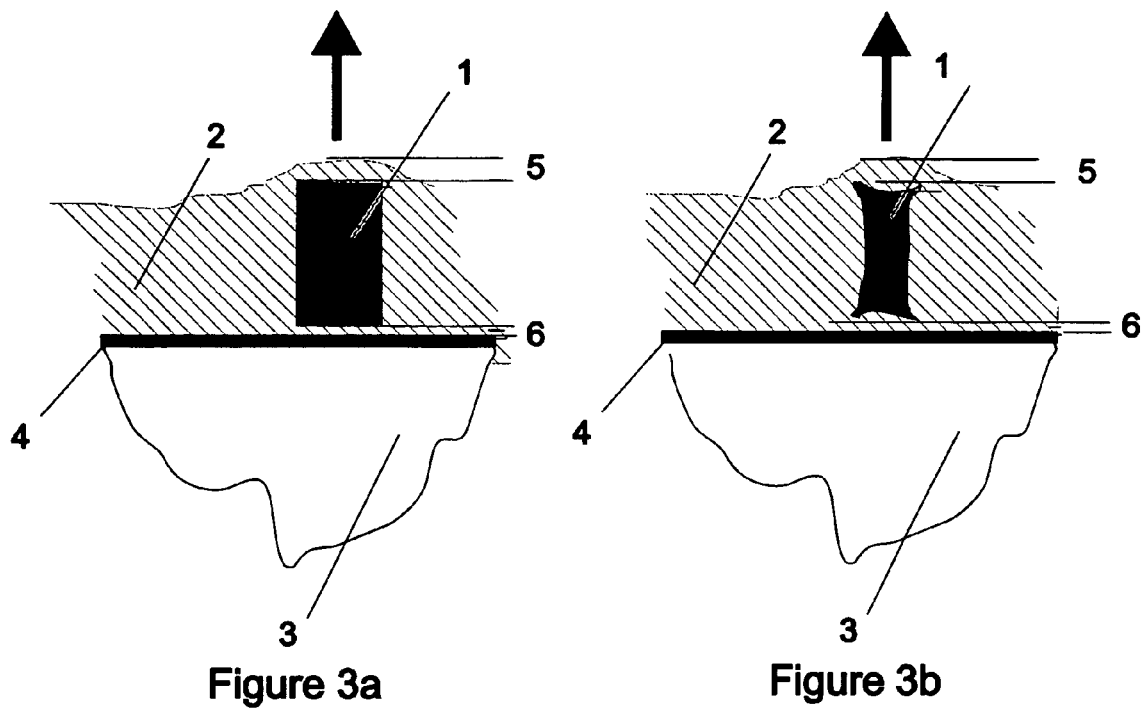
FIG. 3a shows a fully expanded particle in a desired inclined position on a substrate, in a MIMIV configuration.
FIG. 3b shows a partially expanded particle in a desired inclined position on a substrate, in a MIMIV configuration.

FIG. 3a shows the case of a fully expanded particle 1 and FIG. 3b the case of a partially expanded particle 1 standing in a desired inclined position on the substrate 3 in a MIMIV or MIV configuration. Such inclinations are desirable for enhanced field electron emission and occur more readily using particles treated in this way, than when using a more typical untreated particle 1, as in FIG. 3c. In each case, an arrow shows the direction parallel to the basal plane and hence indicates the end that exposes prism planes nearest the vacuum interface. More specifically, each particle 1 may be graphite, which is typically flake-like in the untreated form (FIG. 3c) and more cube-like when it is expanded graphite or partially expanded graphite as in FIGS. 3a and 3b respectively.

Figure 4:
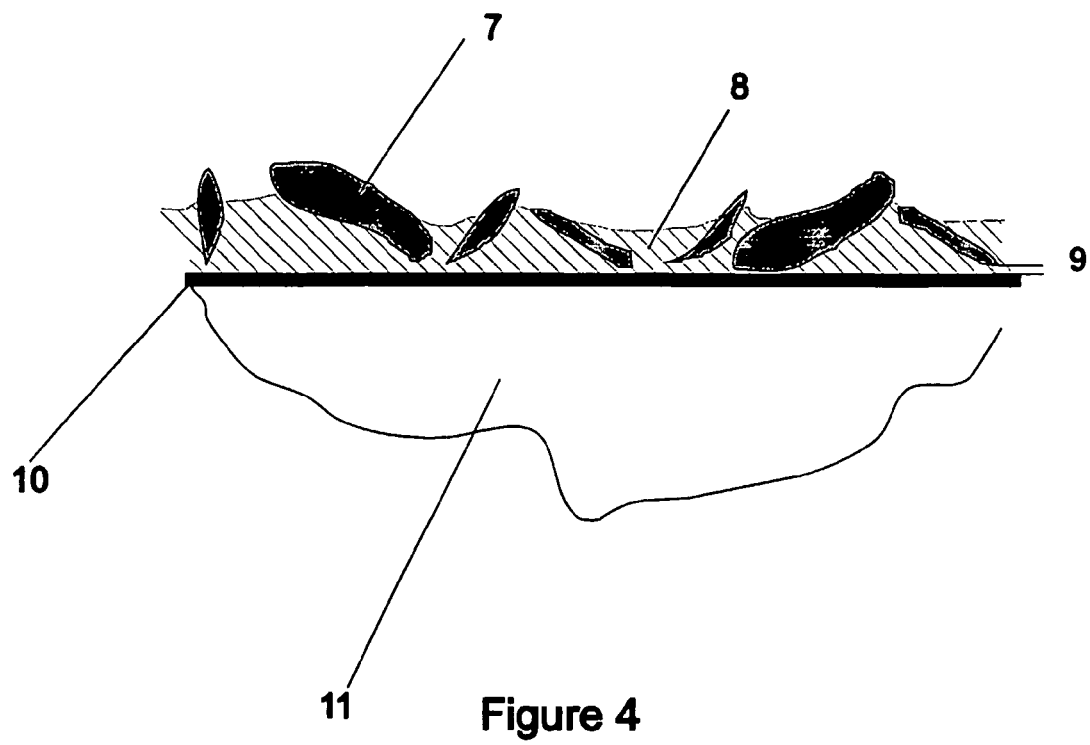
FIG. 4 shows a series of particles which are not fully coated, within an insulating matrix.

FIG. 4 shows a series of electrically conductive particles 7 that are not fully coated, within an insulating matrix 8. Although one may not expect the uncoated particle surface to be a particularly good electron field emitter, this does not turn out to be the case where some or all of the particles are layered particles with expanded inter-planer spaces. More specifically some or all of the particles 7 may be expanded graphite (EG), which may comprise a graphite intercalation compound (GIC). Thickness 9 may vary from zero up, separating the respective particle 7 from underlying back-contact 10 and substrate 11.

Figure 5:
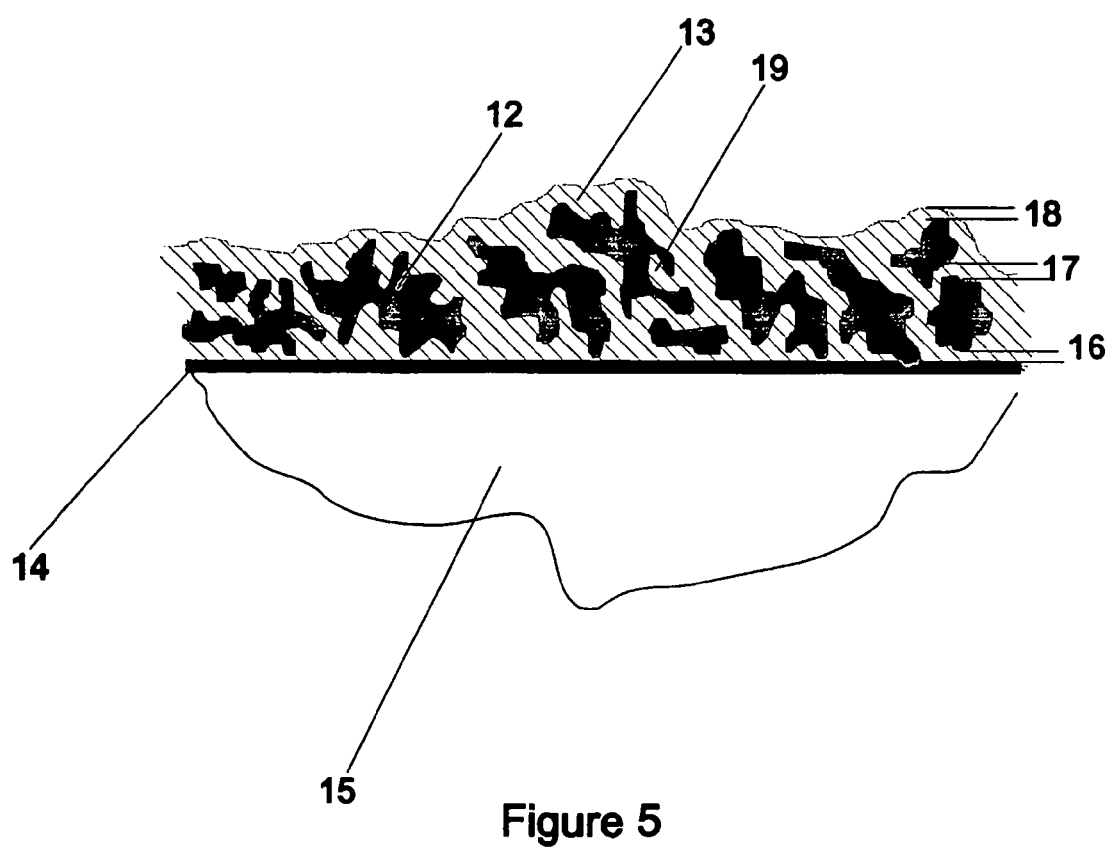
FIG. 5 shows expanded particles with a high structure in an insulating matrix.

FIG. 5 illustrates advantages of using expanded particles 12 with a high structure in an insulating matrix 13 on a usual back contact 14 and substrate 15. In this case, some MIV and MIMIV structures with insulator layers 16 and 18 have inter-particulate insulator layers 17. The fact that a precursor for the insulator may be adsorbed deep into the expanded or exfoliated crystal structure, the pore structures and occluded volume 19 means that the electronic surface transport properties of these complex particulate structures can be favourably modified. Such configurations can be tailored to provide good field electron emission properties in terms of site density and current uniformity while retaining an acceptably smooth surface on which to build a triode device, for example.

Figure 6A:
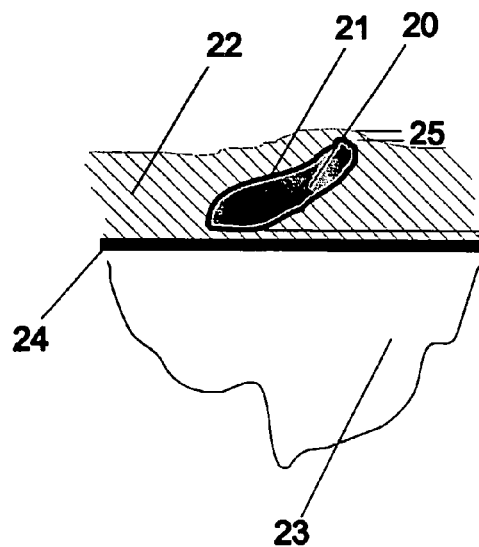
FIGS. 6a to 6d show respective examples of an expanded particle with intercalant remaining.
Figure 6B:
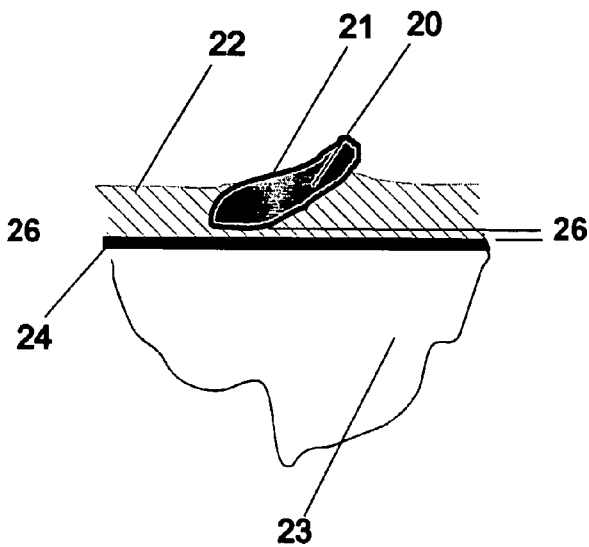
Figure 6C:
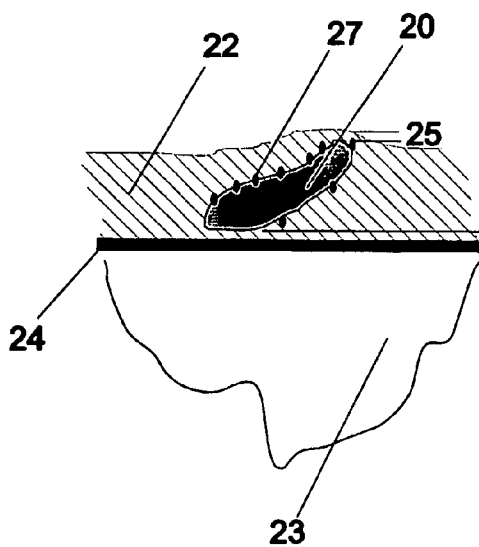
Figure 6D:
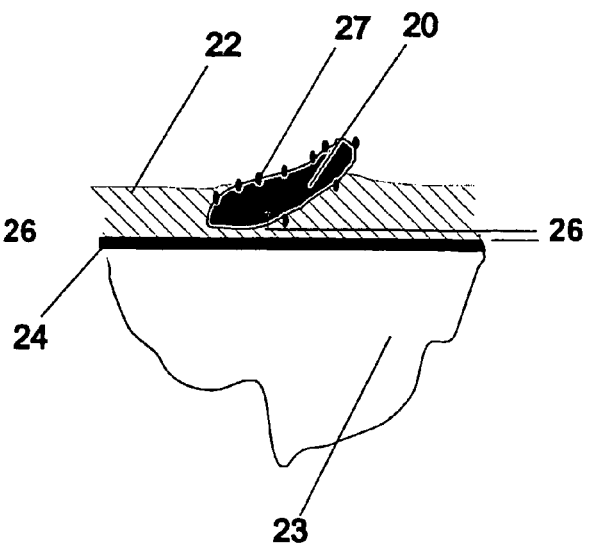

FIGS. 6a to 6d show examples of an intercalated particle 20 in an insulating matrix 22 on a back contact 24, which is itself on a substrate 23, in several situations. In FIGS. 5a and 5b, the particle has a continuous surface layer 21 due to a precipitated salt or other electrically insulating material, and is itself in the form of a MIV (one of thicknesses 25 and 26 is zero) or MIMIV (both thicknesses 25 and 26 are greater than zero) structure. In FIG. 5b, the upper insulator for the emission process is provided solely by the precipitated salt or electrically insulating material and the matrix 22 provides adhesion and the possibility for an insulating layer at the back contact only. In FIGS. 6c and 5d, the precipitated layer is non-continuous and provides isolated points of insulator 27, either wholly or partially embedded in the matrix 22.

Graphite is an anisotropic crystalline material that arises from the regular stacking of individual 'graphene' layers (FIG. 1a, item 100). These consist of $sp^2$-hybridised carbon atoms arranged in a regular hexagonal network to give a flat sheet that can be theoretically infinite in extent. Stacking of the layers is usually in a low-energy arrangement so that 50% of the atoms in layer A sit above the holes in layer B. This ABAB . . . regular stacking is weakly bonded by Van der Waals forces and is known as the tri-periodic graphitic structure, with the AB layer spacing being 0.335 nanometer. In crystallographic terms this spacing is known as the 'd-spacing'. FIG. 1a shows the d-spacing 101. Highly ordered pyrolytic graphite (HOPG) is a large single crystal of graphite that is an exceptional example, because graphite often exhibits various degrees of microstructural imperfections. Foremost, it is possible to accommodate a fault in the ABAB . . . stacking sequence resulting in ABCAB . . . which is also a reasonably low energy arrangement, and is the rhombohedral form of graphite. Other stacking faults can also exist, although ABAABA, for example, is energetically unfavourable.

If the layers are rotated randomly with respect to each other, then there can be no inter-layer correspondence. This gives a turbostratic or bi-periodic crystal which has a minimum inter-layer spacing of 0.344 nanometer. This is a form of non-crystalline graphite, although strictly it is not amorphous, because the individual layer planes are still intact.

However, it can be appreciated that this poor interlayer registry is more energetically unfavourable if the area of the intact layers is large. Hence, in turbostratic graphite, the individual layer planes are often fragmented and relatively small (say 1-5 nanometer across), and of only a few (say 4 or 5) immediate stacked layers in depth. This can be termed a Basic Structural Unit (BSU). Neighbouring units may be mutually disoriented, leading to a solid carbonaceous material consisting of many small crystallites. Carbon blacks are close to this form, but tend to exhibit some continuity between layers and near-by crystallites. Therefore, the term "graphite" in this specification refers to any carbon-containing material in which some of the carbon is found in an $sp^2$ hybridised configuration.

Expanded or exfoliated graphites (EGs) take this enhanced interlayer spacing to an extreme (FIG. 1b shows the expanded d-spacing 102 between graphene layers 100), and have been known for many years in other fields (see below). They are prepared by intercalating materials between the planes and then treating the composite in such a way that a reaction occurs that forces the planes to expand. An example is the intercalation of an acid that then undergoes a gas forming reaction that forces the graphite layers apart as it escapes from the crystal (Bourelle et al., *Mol. Cryst. Liq. Cryst.* 310, pp 321-326 (1998)). The result can be a greatly expanded material, sometimes described as 'worm-like' (if the majority or entirety of the crystal undergoes expansion) or, if only the edges of a particle undergo this process, the effect is a splayed or frayed edge. In these cases, the intercalant is often lost from the crystal during the process, leaving predominantly pure graphite in a modified state. However, some or all of the intercalant may be retained in the interlayer spacing, giving graphite intercalation compounds (GICs), as are mentioned in more detail below.

The appeal and use of EGs has traditionally been in fire retardant materials, in which intercalated graphite forms part of a polymer composite and a final expansion reaction occurs when the material is subject to heat. The result is a rapid volume expansion of the material and a snuffing of the fire due to the action of the foam-like material and possibly the co-release of extinguishing agents (Dietzen et al., DE19856759). Expanded graphites are also used to form low density conducting polymer composites (Chung, U.S. Pat. No. 4,704,231), and flexible graphite foils by compressing and fusing the expanded material into sheets (Mercurin, U.S. Pat. No. 5,985,452). Such sheets can be used as gaskets, for example (Atkinson et al., GB2128270).

Figure 3C:
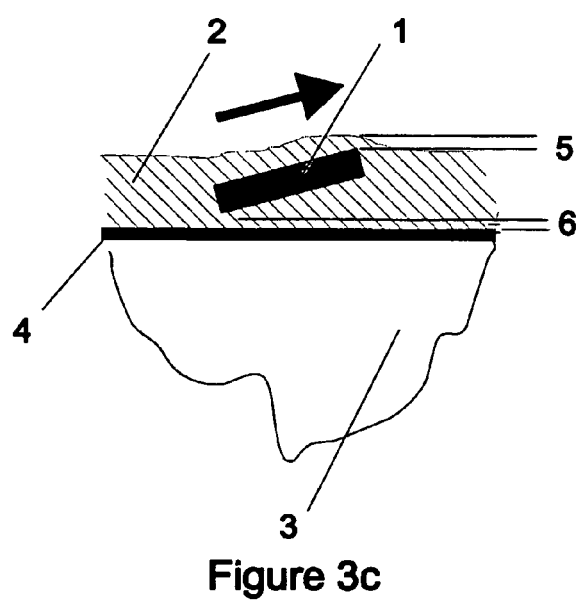
FIG. 3c is a view similar to FIGS. 2a and 2b, but showing a more typical untreated particle.

One embodiment of the present invention is concerned with improving a MIV or MIMIV device that consists of graphite particles by substituting these particles with EGs or EG-precursors. This is shown in FIGS. 3*a* and 3*b*. The primary improvement is that an expanded graphite flake has a more cube-like morphology. This provides it with a broader base on which to stand, so that the prism planes are oriented preferentially perpendicular to the substrate and hence inclined toward the vacuum interface. Conventional flakes and needles of graphite (the most common forms of graphite particles) tend to have a narrow area of prism plane exposure and hence will often lie flatter with the substrate. This is as illustrated in FIG. 3*c*.

The fabrication of small particle EGs can be difficult, though not impossible (Jung & Lorenz, EP0085121), because the intercalant can escape before it has a chance to exert pressure on the crystal. Therefore, suitable EGs can be prepared by milling much larger pre-expanded particles into smaller flakes more suited to a MIV or MIMIV device. However, this does not preclude using larger particles, often worm-like, directly in the material. EGs have been prepared using a variety of intercalants such as nitric acid and then heating to 600 degrees Celsius, for example (Girkant WO9946437). Such materials have already been incorporated into organic composites, sometimes effecting the expansion process during a curing cycle of the material (Chung U.S. Pat. No. 4,946,892). One embodiment of the present invention allows for expansion to occur during a curing cycle of an insulating matrix of a field electron-emitting composite. This may take place during the fabrication of part of a field emission device.

Although not wishing to be bound by a specific model or theory, it is believed that the use of EGs as an improved particle in a MIV or MIMIV device arises from the modified structure of the graphite crystal. The enhanced spacing allows the insulator to penetrate into the particle surface and facilitates electron transfer between the particle and the insulator. This improved transport can include better electron injection from the graphite into the surface insulator (MIV and MIMIV) and/or enhanced electron injection into the graphite from the back-contact (MIV) or lower insulator layer (MIMIV).

In the case where EG structures form a direct interface with the vacuum (FIG. 4), there is enhanced electron emission by virtue of the splayed and exposed prism planes of the graphite crystals extending into vacuum. By tuning the expansion ratio correctly, the surface crystal wave-function will oscillate in a rather similar fashion to open nanotubes extending into free space that are also reported to be good field emission materials (Rinzler et al., *Science,* 269, pp. 1550-1552, 1995). The disadvantage of using nanotubes is that they are costly to produce in large uniform batches and it is difficult to regulate their length and diameter satisfactorily to incorporate into triode structures. In contrast, the expansion of graphite particles can be controlled by regulating the particle size, the extent of intercalation and the type of intercalant used. Therefore, the degree to which the graphite planes expand can be controlled and optimised for field electron emission.

Although emitters may advantageously be obtained by the combination of conducting particles in contact with insulating materials, embodiments of the present invention may also include emitting materials (expanded graphite, for example) that have no associated insulator, but emit directly into vacuum.

In the context of this specification, graphite can be replaced by other particles or materials that occur as layered structures and can thus accommodate foreign material within their microstructure that can allow an expansion process to occur. These include, but are not limited to, $MoS_2$, perovskites, micas, and hexagonal boron nitride. Although such host particles may be insulators in the nascent form, subsequent treatments may provide conducting or semiconducting properties. It also includes crystallographic variants of such materials that maintain layered structures to some degree within the crystal. These include fibres (e.g. carbon fibres), multi-walled nanotubes (e.g. carbon nanotubes), onions (e.g. carbon Buckyonions), and turbostratic materials (e.g. carbon blacks). FIG. 1*c* shows a group of single walled nanotubes (103) with a centre-to-centre spacing 104. However, as already explained, this is not the 'd-spacing', even though material can enter into the pores and in effect expand the overall dimensions of the material, as shown in FIG. 1*d* with larger centre-to-centre spacing 105. True intercalation and hence expansion in the case of nanotubes, within the context of this invention, relates to multi-walled nanotubes as shown in FIG. 1*e* at 106, with a layer-to-layer (d-spacing) indicated by 107. It is this that can be expanded to give increased layer-to-layer (d-spacing) as shown at 108 in FIG. 1*f*. Note, however, that to achieve this requires the concentric graphene layers to fracture. This is more difficult in the highly crystalline nanotubes than in the similarly arranged, but less ordered carbon fibres.

Preferred embodiments of the invention provide a method of improving a field electron emitter by using a "high structure" EG. The term "high structure" will be understood by those skilled in the art of particulate materials, as referring to particles with a high surface area and/or a complex morphology. In the present context, particles advantageously have a high structure, prior to expansion. Such materials are usually quantified by measuring the absorption of n-dibutyl phthalate (DBP) by using a standard procedure (ASTM D 2414-91), and result in a high DBP number. For example, certain brands of graphite powder, nanotube-containing material, carbonaceous soot, and carbon black powder have such properties, although it may apply equally to other suitable particle-based systems. It is also applicable to suitably treated nanotube-containing material (not limited to carbon) in which the usually enclosed void of both single and multiwalled tubes has been opened and available to be filled. In this case the insulator layer is incorporated into the voids, interstices, pores or spaces within a material as well as the expanded layers. In each case the process achieves a high occurrence of internal and peripheral MIV or MIMIV structures (FIG. 4).

As mentioned above, intercalants used to expand a layered particle may remain in the particle, to form an intercalation compound. This may apply to all of the above-described and illustrated examples of the invention.

Graphite intercalation compounds (GICs) have been known for many years. These consist of material intercalated or incorporated between the graphene layers, which can result in electron exchanges between the intercalant and the electronic structure of graphite. A first stage GIC has alternate layers of graphite and intercalant (e.g. AIBIAI . . . ), a second stage GIC has two layers of graphite for each layer of intercalant and a third stage GIC has three layers of graphite, etc.

Their appeal was traditionally as a lightweight conductor, as some GICs exhibit enhanced conductivity over standard graphite (Oblas and Su,, U.S. Pat. No. 4,604,276). More recently, they have been considered for lithium batteries (N. Tsuyoshi et al., U.S. Pat. No. 5,017,444) and fuel cells, including the intercalation of graphite particles (Wakayama et al., U.S. Pat. No. 5,888,430). However, the stability of GICs has always been a problem, and one skilled in the art can appreciate that when a GIC is introduced to a vacuum or heated or both, there is often a driving force for the intercalant to be lost.

Kennel at al. (Tri-service/NASA Cathode Workshop, presentation 8.2, 1994) reported that caesium-intercalated graphite compounds gave anomalous high current electron emission when a particular GIC was heated to temperatures in excess of 250° C. and then operated. However, this disclosure has no teaching as to any requirements for expansion. The purpose of intercalation according to this disclosure was simply to provide positive caesium ions at or near the surface of the graphite, which lowered the localised electron affinity. This itself is not a surprising result (Lang, *Phys Rev. B,* 4, pp. 4234-4244 (1971)).

There are other similar references to caesium deposited on single-walled nanotube bundles (Wadhawan et al., *Applied Physics Letters,* 78, pp. 108-110 (2001)). These researchers discussed the caesium in terms of an adsorbate that could lower the effective threshold for field electron emission from the material, and in turn referred to Suzuki et al. (*Applied Physics Letters* 76, pp. 4007-4009 (2000)). Although the adsorption process of the metal into the pores between individual nanotubes was described as intercalation, it again teaches nothing about expansion and relies entirely on the caesium being retained to provide the lower effective work function of the composite. This situation is illustrated by FIGS. 1c and 1d which, as already discussed, do not provide expansion within the context of this specification.

A MIM or MIMIV device that consists of graphite particles can be improved by substituting these particles with EGs that comprise GICs. This may be, for example, as shown in FIG. 2. Those skilled in the art will now appreciate two key points:

Many unprotected GIcs are not stable in a vacuum environment necessary for field electron emission and so the MIV and MIMIV structures provide important ways of encapsulating GICs in an insulator so that their stability is ensured when operating in a device.

The efficiency of formation of a GIC is largely due to the surface area to volume ratio of the precursor graphite and its crystallinity. Small, high surface area particles and flakes with good degrees of crystallinity are often easier and quicker to fully intercalate. It is these graphitic hosts that have also been found to be exemplary constituent of conventional MIV and MIMIV field electron emitters. Therefore, the GIC variants can be applied to existing formulations very effectively. Small graphite flakes were intercalated with metal halides for high conductivity applications by Oblas and Su (U.S. Pat. No. 4,604,276).

Intercalation can best be achieved by pre-treating the graphite in a vapour comprising at least in part the desired element to be intercalated. Other methods include, but are not confined to, soaking the graphite in a solution of a soluble salt comprising at least in part the desired element or immersing the graphite in molten material comprising at least in part the desired element. The process of intercalation can often be further aided by heating and agitating the mixture.

Only some elements and compounds can be genuinely intercalated in graphite. However, from a MIV or MIMIV perspective, such intercalants could be conductors to facilitate electron transport through the graphite, electropositive elements to enhance electron injection from the graphite into the insulator (MIV and MIMIV), electronegative elements to enhance electron injection into the graphite from the back-contact (MIV) or lower insulator layer (MIMIV), or other elements that enhance the emission characteristics or combine with other elements present to form compounds that so do. In the case where graphite structures form a direct interface with the insulator, there is enhanced electron emission by virtue of the intercalated element lowering the work function of the contacted prism planes of the graphite crystals that extend into the insulator. This may be the physical work function of the intercalated alloy or an apparent work function by virtue of electronic band-bending between the graphite planes, the intercalant, and the insulator.

In the case where graphite structures form a direct interface with the vacuum and where a corresponding GIC is stable in such an environment (e.g. FIG. 3), there is enhanced electron emission by virtue of the intercalated element lowering the work function of the exposed prism planes of the graphite crystals that extend into vacuum. This may be the physical work function of the intercalated alloy or the apparent work function by virtue of electronic band-bending between the graphite planes, the intercalant, and the vacuum.

Such enhancement of electron emission is in addition to that obtained by expansion of the layers, within the context of this specification.

Retained intercalants may enhance field emission properties because they facilitate electron transport through or around the surface of the particles, enhance electron injection from the particle into the insulator, enhance electron injection into the particle from the back-contact (MIV) or lower insulator region (MIMIV), or enhance the emission characteristics or combine with other elements present to form compounds that so do. There may also be enhanced electron emission by virtue of surface salts or precipitates acting as an electrically insulating entity and being part of or creating a MIV or MIMIV structure. There is no requirement for this to be a continuous layer (FIGS. 5c and 5d).

An important feature of preferred embodiments of the invention is the ability to inexpensively pre-treat graphite particles before formulating as ink For example, intercalants may be available cheaply and in liquid form, such that they may readily be mixed with conductive particles. However, more expensive techniques such as ion-implantation, electron beam irradiation, plasma immersion and other plasma treatments of each particle to effect intercalation to then effect expansion may also be utilised.

An intercalant used to expand a layered material may be substantially completely expelled during expansion process, or partly or substantially fully retained after expansion. In all cases, a further intercalant may be introduced between the layers after expansion, to further enhance the electron emission properties of the material.

In various embodiments of the invention, where a layered material is expanded, expansion of the whole material may be achieved, or expansion of just part of the material may be achieved—particularly at edges of the material, to give a frayed edge effect.

As mentioned above, various embodiments of the invention may provide layered materials that are at least partly in contact with insulators, which includes both organic and inorganic insulators.

Preferred embodiments of the present invention aim to provide cost-effective broad area field emitting materials and devices that may be used in devices that include (amongst others): field electron emission display panels; high power pulse devices such as electron MASERS and gyrotrons; crossed-field microwave tubes such as CFAs; linear beam tubes such as klystrons; flash x-ray tubes; triggered spark gaps and related devices; broad area x-ray sources for sterilisation; vacuum gauges; ion thrusters for space vehicles; particle accelerators; ozonisers; and plasma reactors.

Figure 7A:
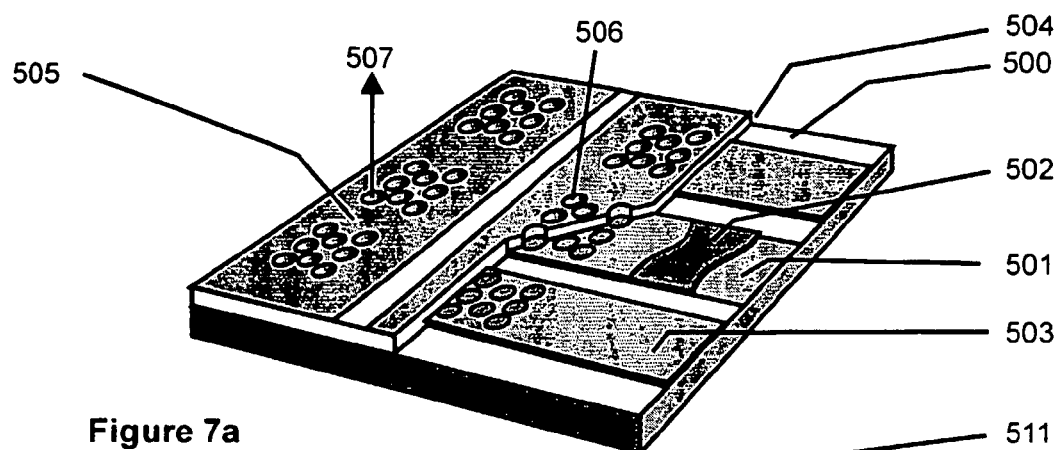
FIGS. 7a to 7c illustrate examples of devices that utilise examples of broad area field electron emitters.
Figure 7B:
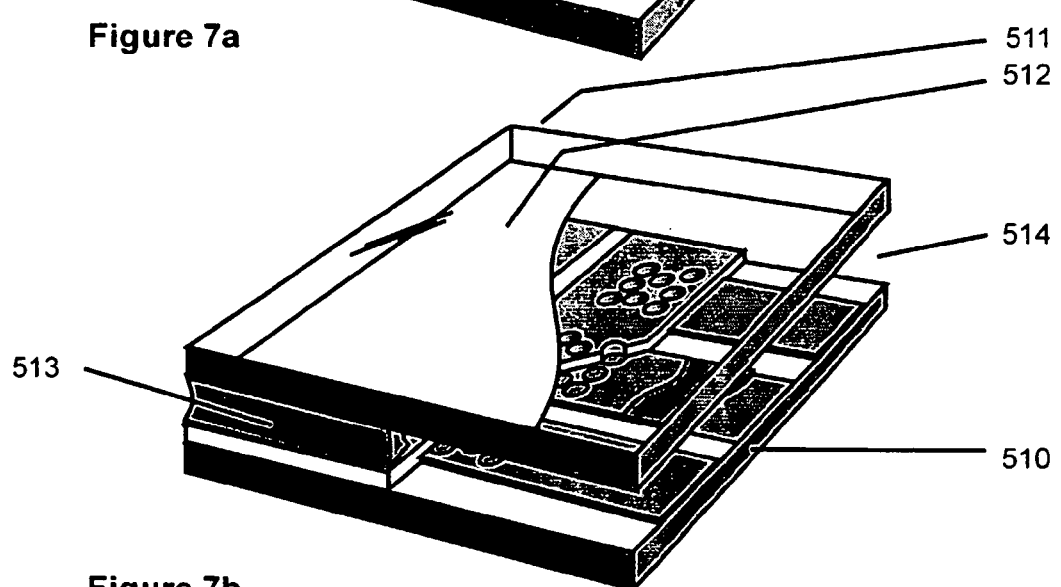
Figure 7C:
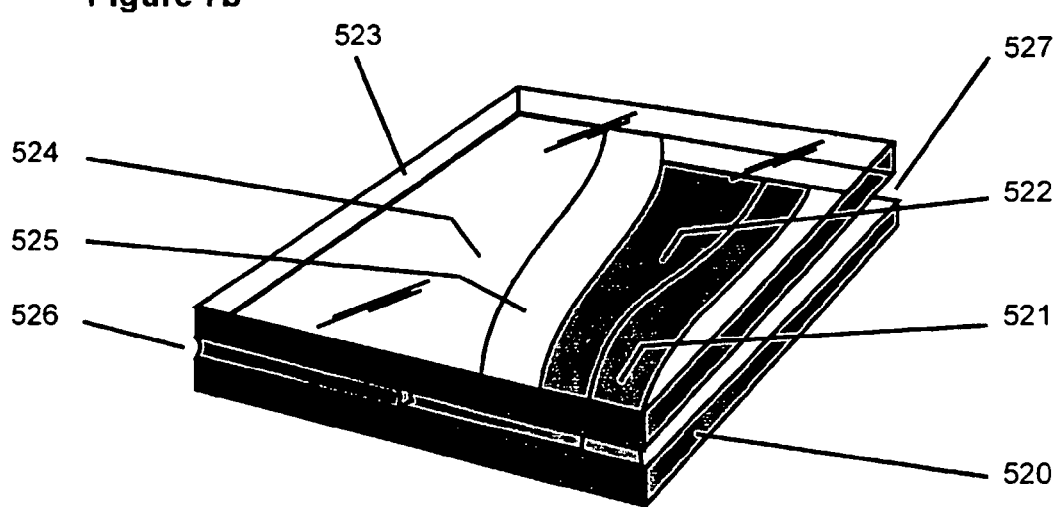

Examples of some of these devices are illustrated in FIGS. 7a, 7b and 7c.

FIG. 7a shows an addressable gated cathode as might be used in a field emission display. The structure is formed of an insulating substrate 500, cathode tracks 501, emitter layer 502, focus grid layer 503 electrically connected to the cathode tracks, gate insulator 504, and gate tracks 505. The gate tracks and gate insulators are perforated with emitter cells 506. A negative bias on a selected cathode track and an associated positive bias on a gate track cause electrons 507 to be emitted towards an anode (not shown).

The reader is directed to our patent GB 2 330 687 B for further details of constructing Field Effect Devices.

The electrode tracks in each layer may be merged to form a controllable but non-addressable electron source that would find application in numerous devices.

FIG. 7b shows how the addressable structure 510 described above may be joined with a glass fritt seal 513 to a transparent anode plate 511 having upon it a phosphor screen 512. The space 514 between the plates is evacuated, to form a display.

Although a monochrome display has been described, for ease of illustration and explanation, it will be readily understood by those skilled in the art that a corresponding arrangement with a three-part pixel may be used to produce a colour display.

FIG. 7c shows a flat lamp using one of the above-described materials. Such a lamp may be used to provide backlighting for liquid crystal displays, although this does not preclude other uses, such as room lighting.

The lamp comprises a cathode plate 520 upon which is deposited a conducting layer 521 and an emitting layer 522. Ballast layers as mentioned above (and as described in our other patent applications mentioned herein) may be used to improve the uniformity of emission. A transparent anode plate 523 has upon it a conducting layer 524 and a phosphor layer 525. A ring of glass fritt 526 seals and spaces the two plates. The interspace 527 is evacuated.

The operation and construction of such devices, which are only examples of many applications of embodiments of this invention, will readily be apparent to those skilled in the art. An important feature of preferred embodiments of the invention is the ability to print the field electron emission material, when formed as an ink, as an electrode pattern, thus enabling complex multi-emitter patterns, such as those required for displays, to be created at modest cost. Furthermore, the ability to print enables low-cost substrate materials, such as glass to be used; whereas micro-engineered structures are typically built on high-cost single crystal substrates. In the context of this specification, printing means a process that places or forms an emitting material in a defined pattern. Examples of suitable processes are (amongst others): screen printing, Xerography, photolithography, electrostatic deposition, spraying, ink jet printing and offset lithography.

Once field emission material has been applied as an ink, expansion of the layered material may take place during subsequent curing of the ink. For example, this may take place conveniently during a heat treatment step in an assembly process of a respective device.

Devices that embody the invention may be made in all sizes, large and small. This applies especially to displays, which may range from a single pixel device to a multi-pixel device, from miniature to macro-size displays.

Preferred embodiments of the invention are cold cathode devices—that is, the field emission material is part of the cathode of the device and is arranged to emit electrons without being at elevated temperatures and therefor without the application of heat.

A cold cathode material in the context of this specification is a material in which electrons field emit into vacuum (or other environment) at or near room temperature. By room temperature we mean 25° C., and by near room temperature we mean in the range 0° C. to 100° C. However, we do not exclude cooling or heating the material to allow it to operate at other temperatures, or in other environments.

In this specification, the verb "comprise" has its normal dictionary meaning, to denote non-exclusive inclusion. That is, use of the word "comprise" (or any of its derivatives) to include one feature or more, does not exclude the possibility of also including further features.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A field electron emission material formed of a particulate electrically conductive material comprising layers of atoms in which the inter-layer spacing has been expanded, the electrically conductive material being at least partly coated with an electrically insulating material to form a MIV or MIMIV structure.

2. A field electron emission material according to claim 1, wherein the particles of said layers are crystalline.

3. A field electron emission material according to claim 2, wherein said layers are turbostratic.

4. A field electron emission material according to claim 2, wherein said layers are highly ordered.

5. A field electron emission material according to claim 1, wherein said layered material comprises graphite.

6. A field electron emission material according to claim 1, wherein said layered material comprises at least one of carbon nanotubes, carbon fibres, carbon Buckyonions and carbon black.

7. A field electron emission material according to claim 1, wherein said layered material comprises at least one of $MoS_2$, perovskites, micas, and hexagonal boron nitride.

8. A field electron emission material according to claim 1, wherein the particle size of said expanded layered material is in the range 0.1 to 1000 μm, in the direction of expansion.

9. A field electron emission material according to claim 1, wherein the particle size of said expanded layered material is in the range 0.1 to 400 μm, in a direction normal to the direction of expansion.

10. A field electron emission material according to claim 1, wherein said expanded layered material is disposed upon a planar substrate, and its layers are oriented at an angle greater than 0 degrees to the substrate plane.

11. A field electron emission material according to claim 10, wherein said layers are oriented substantially perpendicular to said substrate plane.

12. A field electron emission material according to claim 1, wherein said expanded layered material has a DBP number in the range 20 to 500.

13. A field electron emission material according to claim 1, wherein said layered material has been expanded by an intercalant that has been introduced between layers of the material.

14. A field electron emission material according to claim 13, wherein said intercalant no longer resides in the material.

15. A field electron emission material according to claim 13, wherein at least some of said intercalant remains in the material.

16. A field electron emission material according to claim 1, wherein an intercalant has been introduced between layers of the material; after expansion of the material.

17. A field electron emission material according to claim 1, wherein said material has been placed in position on a substrate by a printing process.

18. A field electron emission material according to claim 1, wherein said layered material has been expanded during a curing cycle of the material.

19. A field electron emission material according to claim 18, wherein said curing takes place after the material has been placed in position on a substrate.

20. A field electron emitter formed from a field emission material according to claim 1, and arranged to serve as a cathode in a field electron emission device.

21. A field electron emitter according to claim 20, arranged to emit electrons without the application of heat.

22. A field electron emission device comprising a field electron emitter according to claim 20, and means for applying an electric field to said field emission material, thereby to cause said material to emit electrons.

23. A field emission device according to claim 22, wherein said layered material has been expanded during a curing cycle of the material, and said curing has taken place during an assembly process of said device.

24. A field electron emission device according to claim 22, comprising a substrate with an array of patches of said field electron emitters, and control electrodes with aligned arrays of apertures, which electrodes are supported above the emitter patches by insulating layers.

25. A field electron emission device according to claim 24, wherein said apertures are in the form of slots.

26. A field electron emission device according to claim 22, comprising a plasma reactor, corona discharge device, silent discharge device, ozoniser, an electron source, electron gun, electron device, x-ray tube, vacuum gauge, gas filled device or ion thruster.

27. A field electron emission device according to claim 22, wherein the field electron emitter supplies the total current for operation of the device.

28. A field electron emission device according to claim 22, wherein the field electron emitter supplies a starting, triggering or priming current for the device.

29. A field electron emission device according to claim 22, comprising a display device.

30. A field electron emission device according to claim 22, comprising a lamp.

31. A field electron emission device according to claim 30, wherein said lamp is substantially flat.

32. A field electron emission device according to claim 22, wherein said emitter is connected to an electric driving means via a ballast resistor to limit current.

33. A field electron emission device according to claim 24, wherein said emitter is connected to an electric driving means via a ballast resistor to limit current and said ballast resistor is applied as a resistive pad under each said emitting patch.

34. A field electron emission device according to claim 22, wherein said emitter material and/or a phosphor is/are coated upon one or more one-dimensional array of conductive tracks which are arranged to be addressed by electronic driving means so as to produce a scanning illuminated line.

35. A field electron emission device according to claim 34, including said electronic driving means.

36. A field electron emission device according to claim 22, wherein said field emitter is disposed in an environment which is gaseous, liquid, solid, or a vacuum.

37. A field electron emission device according to claim 22, comprising a cathode which is optically translucent and is so arranged in relation to an anode that electrons emitted from the cathode impinge upon the anode to cause electroluminescence at the anode, which electro-luminescence is visible through the optically translucent cathode.

38. A field electron emission material formed of a material comprising layers of atoms in which the inter-layer spacing has been expanded, the electrically conductive material being at least partly coated with an electrically insulating material to form a MIV or MIMIV structure, wherein said layers are crystalline and turbostratic.

39. A field electron emitter formed from a field emission material according to claim 38, and arranged to serve as a cathode in a field electron emission device.

40. A field electron emitter according to claim 39, arranged to emit electrons without the application of heat.

41. A field electron emission device comprising a field electron emitter according to claim 39, and means for applying an electric field to said field emission material, thereby to cause said material to emit electrons.

42. A field electron emission material formed of a material comprising layers of atoms in which the inter-layer spacing has been expanded, the electrically conductive material being at least party coated with an electrically insulating material to form a MIV or MIMIV structure, wherein said expanded layered material is disposed upon a planar substrate and said layers are oriented substantially perpendicular to the plane of said substrate.

43. A field electron emitter formed from a field emission material according to claim 42, and arranged to serve as a cathode in a field electron emission device.

44. A field electron emitter according to claim 43, arranged to emit electrons without the application of heat.

45. A field electron emission device comprising a field electron emitter according to claim 43, and means for applying an electric field to said field emission material, thereby to cause said material to emit electrons.

46. A field electron emission material formed of a material comprising layers of atoms in which the inter-layer spacing has been expanded, the electrically conductive material being at least partly coated with an electrically insulating material to form a MIV or MIMIV structure, wherein said layered material has been expanded by an intercalant that has been introduced between layers of the material, which intercalant no longer resides in the material.

47. A field electron emitter formed from a field emission material according to claim 46, and arranged to serve as a cathode in a field electron emission device.

48. A field electron emitter according to claim 47, arranged to emit electrons without the application of heat.

49. A field electron emission device comprising a field electron emitter according to claim 47, and means for applying an electric field to said field emission material, thereby to cause said material to emit electrons.

50. A field electron emission material formed of a material comprising layers of atoms in which the inter-layer spacing has been expanded, the electrically conductive material being at least partly coated with an electrically insulating material to form a MIV or MIMIV structure, wherein an intercalant has been introduced between layers of the material, after expansion of the material.

51. A field electron emitter formed from a field emission material according to claim 50, and arranged to serve as a cathode in a field electron emission device.

52. A field electron emitter according to claim 51, arranged to emit electrons without the application of heat.

53. A field electron emission device comprising a field electron emitter according to claim 51, and means for applying an electric field to said field emission material, thereby to cause said material to emit electrons.

* * * * *